United States Patent [19]
Coy et al.

[11] Patent Number: 5,644,766
[45] Date of Patent: Jul. 1, 1997

[54] SYSTEM AND METHOD FOR MANAGING A HIERARCHICAL STORAGE SYSTEM THROUGH IMPROVED DATA MIGRATION

[75] Inventors: Henry Robert Coy, Boca Raton, Fla.; Robert M. Rees; Luis Felipe Cabrera, both of San Jose, Calif.

[73] Assignee: International Business Machines Corporation, Armonk, N.Y.

[21] Appl. No.: 697,397

[22] Filed: Aug. 23, 1996

Related U.S. Application Data

[63] Continuation of Ser. No. 198,972, Mar. 22, 1994, abandoned.

[51] Int. Cl.$^6$ .................... G06F 13/00; G06F 12/00
[52] U.S. Cl. ............... 395/620; 395/621; 395/444; 395/488; 364/246; 364/283.2; 364/DIG. 1
[58] Field of Search .................... 395/600, 441, 395/488, 497.02, 848, 444; 364/228.1, 222.81, 246.3, 243, 282.1, 246, 283.2

[56] References Cited

U.S. PATENT DOCUMENTS

| | | | |
|---|---|---|---|
| 4,183,083 | 1/1980 | Chatfield | 364/200 |
| 4,817,050 | 3/1989 | Komatsu et al. | 364/900 |
| 4,888,681 | 12/1989 | Barnes et al. | 364/200 |
| 4,974,156 | 11/1990 | Harding et al. | 364/200 |
| 4,987,533 | 1/1991 | Clark et al. | 364/200 |
| 5,018,060 | 5/1991 | Gelb et al. | 364/200 |
| 5,133,065 | 7/1992 | Cheffetz et al. | 395/575 |
| 5,237,682 | 8/1993 | Bendert et al. | 395/600 |
| 5,276,860 | 1/1994 | Fortier et al. | 395/575 |
| 5,276,867 | 1/1994 | Kenley et al. | 395/600 |
| 5,367,698 | 11/1994 | Webber et al. | 395/800 |
| 5,423,034 | 6/1995 | Cohen-Levy et al. | 395/600 |

FOREIGN PATENT DOCUMENTS

| | | |
|---|---|---|
| 1-173236 | 7/1989 | Japan . |
| 4-107750 | 4/1992 | Japan . |
| 4-165541 | 6/1992 | Japan . |
| 3-273275 | 4/1993 | Japan . |

OTHER PUBLICATIONS

W.D. Roome, "3DFS: A Time–Oriented File Server," proceedings of the Summer USENIX Conference 1991.

R.M. Bryant and P.A. Franaszek, "Method for Allocating Computer Disk Space To A File Of Known Size" IBM TDB vol. 27, No. 10B, Mar. 1985, pp. 6260–6261.

*Primary Examiner*—Thomas G. Black
*Assistant Examiner*—Greta L. Robinson
*Attorney, Agent, or Firm*—Esther E. Klein

[57] ABSTRACT

A system and method are provided for preserving spacial and temporal locality of sets of related objects when moving the sets within a storage hierarchy via a common server. The appropriate meta data is gathered to track the spacial and temporal locality of the sets of objects being moved within the storage hierarchy and the algorithm uses the meta data to preserve the spacial and temporal locality when moving the objects. A collection of logically clustered data objects is identified. The logical cluster is then moved down through the storage hierarchy together to be stored in less costly storage devices. The logical cluster of data objects is then retrievable more efficiently as a whole when requested.

20 Claims, 7 Drawing Sheets

| CLIENT NODE (40) | USER (41) | UUID (42) |
|---|---|---|
| C2 | SMITH | A3422 |
| C10 | PORTER | B2459 |

B

| CLIENT NODE (43) | MEDIA INSTANCE (44) |
|---|---|
| C1 | TAPE 1 |
| C5 | DISK 3 |

C

| CLIENT NODE (45) | DEVICE (46) | LOGICAL CLUSTER (47) | NAMED COLLECTION (48) | UCID |
|---|---|---|---|---|
| C3 | JUKEBOX 1 | C: | C:DIR1 | 29456 |
| C20 | JUKEBOX 10 | /B/A | /B/A/DIR1 | 34888 |

D

| UUID (49) | OBJECT NAME (50) | UOID (51) |
|---|---|---|
| C2749 | FILE-10 | 3745A2 |
| M8411 | FILE-48 | 2459B6 |

E

| UUID (52) | UCID (53) | MEDIA INSTANCE (54) | DATE (55) | UOID (56) |
|---|---|---|---|---|
| G2925 | 89734 | TAPE 12 | 931202 | 4731F4 |
| K2454 | 42573 | DISK 9 | 931114 | 5921L1 |

F

| MEDIA INSTANCE (57) | UOID (58) |
|---|---|
| TAPE 4 | 1237A2 |
| TAPE 4 | 7894G3 |

G

| UOID (59) | MEDIA INSTANCE (60) |
|---|---|
| 4792A3 | TAPE 2 |
| 4792A3 | DISK 3 |

H

| MEDIA INSTANCE (62) | CAPACITY (MBYTES) (63) | SPACE USED (MBYTES) (64) |
|---|---|---|
| TAPE 3 | 250 | 100 |
| TAPE 7 | 600 | 200 |
| TAPE 22 | 5000 | 1500 |

I

| MEDIA INSTANCE (65) | CLIENT NODE (66) | UCID (67) |
|---|---|---|
| TAPE 3 | C2 | 24579 |
| TAPE 3 | C2 | 27943 |
| TAPE 3 | C4 | 28922 |
| TAPE 7 | C2 | 24891 |

SYSTEM AND METHOD FOR MANAGING A HIERARCHICAL STORAGE SYSTEM THROUGH IMPROVED DATA MIGRATION

This application is a continuation of U.S. application Ser. No. 08/198,972, filed Mar. 22, 1994, now abandoned.

FIELD OF THE INVENTION

This invention relates to computer controlled data storage systems, and more particularly to management of a computerized hierarchical data storage system.

BACKGROUND OF THE INVENTION

As the number of personal computers, workstations and servers continues to grow, the amount of important business and technical data stored on these computers also increases. The need for increased data storage space within an enterprise grows continuously. One reason for the growth is that users want to keep many files at their fingertips, even those that are rarely used, but are nevertheless valuable.

Archival systems provide workstation users the ability to optionally delete seldom used files on their workstations after a copy has been archived. Users have the option of asking the system to archive a complete collection of files. In that way, users can free up valuable space on their workstations, but still easily and quickly retrieve archived files when needed. This helps users make more efficient and effective use of workstation storage.

Stand-alone back-up tools, that typically store copies of files that have been modified recently using disks or tapes, are often used for back-up storage to protect the data. An enterprise that automatically backs up all new and changed workstation files each evening, for example, has the added benefit of being able to recover a file that is accidentally lost.

Within a single enterprise, there can be a variety of types of workstations and computer systems that are used and need to be backed up to safeguard against loss. For example, engineers may be using UNIX on their workstations, the accounting group may be using DOS, and there may be LAN servers running Novell Netware. Workstations can be attached through a LAN where commonly used applications and critical data are stored on the file servers.

Storage management systems striving to reduce storage costs place back-up and archive data in storage hierarchies consisting of different kinds of storage devices. One such storage management system is the IBM Adstar Distributed Storage Manager (ADSM) product. In ADSM, all available storage is divided into storage pools where each storage pool is assigned a unique name. A storage pool can be mapped to any storage device. However, all devices in a storage pool must be the same type of device. Administrators can set up as many storage pools as their businesses require. Storage pools can be managed dynamically while the system is operational. A plurality of storage pools can be arranged into a storage hierarchy.

Typically, an installation defines a hierarchy based on the speed and availability of the storage devices. The highest level of the hierarchy has the faster direct access storage devices (DASDs), while the lowest level has the more economical removable and sequential access storage devices such as individual tapes, tape jukeboxes or optical jukeboxes. In a storage hierarchy based on the speed of the storage devices, both cost of storage and access speed increase towards the higher levels of the hierarchy.

When the amount of data in a storage pool reaches a high occupancy threshold specified by the administrator, data objects can be automatically moved to the next available storage pool level in the hierarchy. This movement of data is called migration. Migration continues until the storage pool from which the data is migrating reaches the low occupancy threshold specified by the administrator.

An object placement management system can be deployed as a server accessed by heterogeneous clients over a network of computers. The client can request that objects under its control be moved to the storage hierarchy. Additionally, the server can poll a client and then initiate the backup of objects under the control of the client. The storage server can be a multi-level storage hierarchy where objects moved to it are stored and archived. An example of a storage hierarchy in a file backup system is a set of DASDs to stage the files being backed up and a set of tape libraries to archive the files.

The server uses its higher speed storage devices to stage sets of objects being moved to it. In particular, when the server has magnetic disks in addition to optical devices or tape devices used for archival storage, the disks are used in combination with main memory to stage the objects being moved. In the presence of a disk at the server, an object is considered moved by the client when it has been copied from the client storage to the local disk of the server. In the absence of a local disk at the server, the object needs to be written out to the archival device of the server to be considered moved by the client.

Objects can have any arbitrary size, therefore, it may not always be possible to move a collection of objects into only one media instance. Collections and even individual objects may spill over several media instances. It is desirable in such situations that the number of media instances of a storage hierarchy in which collections of objects are moved, be minimized.

Objects may belong to named collections such as a file system or a directory containing individual files that are given a name by the system. A named collection also refers to files belonging to the same owner (from the same user ID). It is desirable that when named collections are moved, information about the objects in the named collection be maintained in order to keep the collections together. This preserves the logical clustering defined by a user through a named collection.

Standard back-up utilities in UNIX, back up large collections of network clients using time as the criterion for invoking the back-up service. However, these systems usually back up files in a time clustered way, placing together in tapes all the files backed up in a given session.

An example of a UNIX based file server that uses a storage hierarchy is 3DFS. "3DFS: A Time Oriented File Server", W. D. Roome, Proceedings of the Summer USENIX Conference, 1991, implements an extended file server system where versions of files are maintained indefinitely. 3DFS has the ability to display contents of directories as they existed on a given date. 3DFS can also retrieve all the versions that have ever existed of a file in a directory. However, 3DFS does not allow data to be stored according to users or to source devices. Thus, the retrieval of all files belonging to disk drive X on date Y is difficult to support efficiently, as many storage devices may need to be visited to retrieve the required files.

Enterprises need to be able to use co-location criteria to speed retrieval of sets of objects (such as data files) placed in a storage hierarchy. An example of a set of co-location properties for files includes the owner of the files, the node or device where the owner resides, the device where the files are stored, and the date the files were created or last used. In particular, it is desirable for file back-up services to make use of co-location criteria associated with files. Bulk retrievals are necessary, for example, when a disk of a client fails which needs to be recovered. Large installations can encounter client disk failures at a rate of one per day.

There is a need to preserve the spacial and temporal localities that exist in sets of objects being moved within a storage hierarchy. Sets of objects may be moved in their entirety or in increments according to pre-specified criteria. It can also be desirable to be able to keep together arbitrary clusters of objects in any storage hierarchy.

More particularly, there is a need to optimize the performance of the critical but rather infrequent operation of retrieving sets of objects from lower levels of the storage hierarchy without incurring a high performance penalty during the more common operation of moving sets of objects down the storage hierarchy. In a storage hierarchy, a cost of storing an object is higher at higher levels of the storage hierarchy, but time to access an object in a higher level of storage hierarchy is lower. There is a central tradeoff in all storage hierarchies between the monetary cost of storing an object at a given level of a storage hierarchy versus the performance cost of retrieving the object from that level.

There are a number of software systems that would benefit from administering the movement or migration of objects in a hierarchy of storage devices. Examples of such systems are network based client server file back-up systems; systems that store digital images, in particular, medical images; systems that store faxes in digital form; systems that store video in digital form; and systems that store digital multimedia data.

One or more of the foregoing problems are overcome, and one or more of the foregoing objects are achieved by the present invention.

SUMMARY OF THE INVENTION

A computerized object management system manages data objects stored in a hierarchial storage system. The system comprises a plurality of levels of non-volatile storage devices for storing data wherein a lower level non-volatile storage device stores data more economically than ones in the higher levels. Logical clusters of data objects (such as files) are collections that are desirable to store as close together as possible within the media instances used to store the data objects within a storage pool. Means are provided for identifying a logical cluster of data in any level, and means are provided for identifying a media instance in a storage pool at a lower level for storing the logical cluster. Storage means are also provided for storing the logical cluster in the media instance. The system is managed by a server receiving data objects for back-up from a plurality of clients. The data objects always carry with them an associated clustering key that identifies the logical cluster to which they belong. When requested to retrieve logical clusters of data, the data objects in a logical cluster are retrieved as a whole collection, thereby minimizing retrieval costs. The data is clustered based on such attributes as the a user ID associated with the data and the file system to which the data belongs.

In a computerized data storage management system having a central processing unit (CPU) and a memory, in communication with a hierarchical storage system with multiple levels of storage devices, a method is provided for managing the data in the storage devices. Logical clusterings are determined for the data objects at the highest or first level of a storage hierarchy. Media instances at a lower level of the storage hierarchy are identified. Logical clusterings of data objects in a higher level are moved to the media instances in the next lower level. The previous steps are repeated until the logical clustering is at the most economical level of the storage hierarchy.

A logically clustered collection of objects (such as a named collection) can be moved completely or incrementally. When moving a complete collection, all the objects in the collection are copied down in the storage hierarchy of the server. In an incremental move, one criteria is to move down the hierarchy only those objects that have changed since the last move.

The migration process can leave behind duplicate copies of the data object that it placed on a lower storage pool of the hierarchy. These duplicate copies are deleted only when space is needed. This allows more data objects to be available for faster retrieval devices. Duplicate data objects are not used when calculating the amount of data stored on the storage pool.

When back-up data objects on a sequential medium such as tape are marked for deletion, these data objects are logically deleted by modifying the space occupancy information kept by the system. This leaves space on the tape that is no longer being used. The object placement management system on the server also has a facility that automatically reclaims this tape's space. When the percentage of space that is in use on a tape media instance falls below a threshold specified by the administrator, an operator receives a message to mount a new media instance. All the usable data on the fragmented media is consolidated on the new media instance. After this operation, the entire capacity of the old media instance can be reused to store new data. This operation is called space reclamation.

The co-location feature of the object placement management system places all data objects associated with the client file system on a minimum number of storage media instances in the hierarchy. Co-location strives to place logical clusters in a minimum number of media instances. Because these files are consolidated, tape mounts are reduced during a restore or retrieve. This reduces the amount of time it takes to restore or retrieve large numbers of clustered files from tapes. Furthermore, both the data migration and space reclamation processes work in conjunction with the co-location feature to guide the placement of client files within the server storage hierarchy. The server uses an internal database that stores all information related to its operation. Information stored in the database includes client node registrations, client file locations within storage pools, policy management definitions such as policy domains sets, management classes and copy groups, administration registrations, central scheduling definitions, client file space names, such as the name of the client objects which have been backed up or archived to the server.

Each object is assumed to have a time of last modification. In many file backup systems, a time stamp is used as a main criteria to determine what elements of a set being moved incrementally need to be moved within the hierarchy of archival storage devices. Last modification time establishes whether a new version of the object resides at a client and thus whether it is necessary to move the object or not. The last modification time is also used to establish the identity of a collection of objects that belong to a logically clustered collection (such as a named collection) at the time of a move in the storage hierarchy. A collection of objects can be moved completely or incrementally. When moving a complete collection, all the objects in the collection are copied down in the storage hierarchy of the server. In an incremental move, one criteria is to move down the hierarchy only those objects that have changed since the last move. The user may specify whether the complete collection ought to go into a specific media storage pool or not.

It is an object of the invention to preserve the spacial and temporal locality of sets of objects being moved within a storage hierarchy by gathering the appropriate meta data to track the spacial and temporal locality of the sets of data objects.

It is an object of the invention to optimize the performance of the critical but rather infrequent operation of retrieving sets of data objects from lower levels of the storage hierarchy without incurring a high performance penalty when doing the more common operation of moving sets of objects down the storage hierarchy.

It is an object of the invention to minimize the time for retrieving from lower levels of the storage hierarchy sets of data objects that have spacial or temporal locality in a client. In particular, in the case of file systems, all data objects that belong to a single directory (i.e. are part of a named collection) tend to be in one media instance of the storage hierarchy, for example, a magnetic disk, optical disk or magnetic tape. All data objects that belong in a directory at a given time or date tend to be in one media instance. All data objects that are stored in a specific storage device of a client computing node tend to be in a minimum number of media instances.

It is a further object of the invention that when individual objects are moved, appropriate information (meta data) is kept about the collection to which it belongs and the object itself. The co-location process can then reconstruct all the existing clustering relationships between objects.

DETAILED DESCRIPTION OF THE INVENTION

Figure 1:
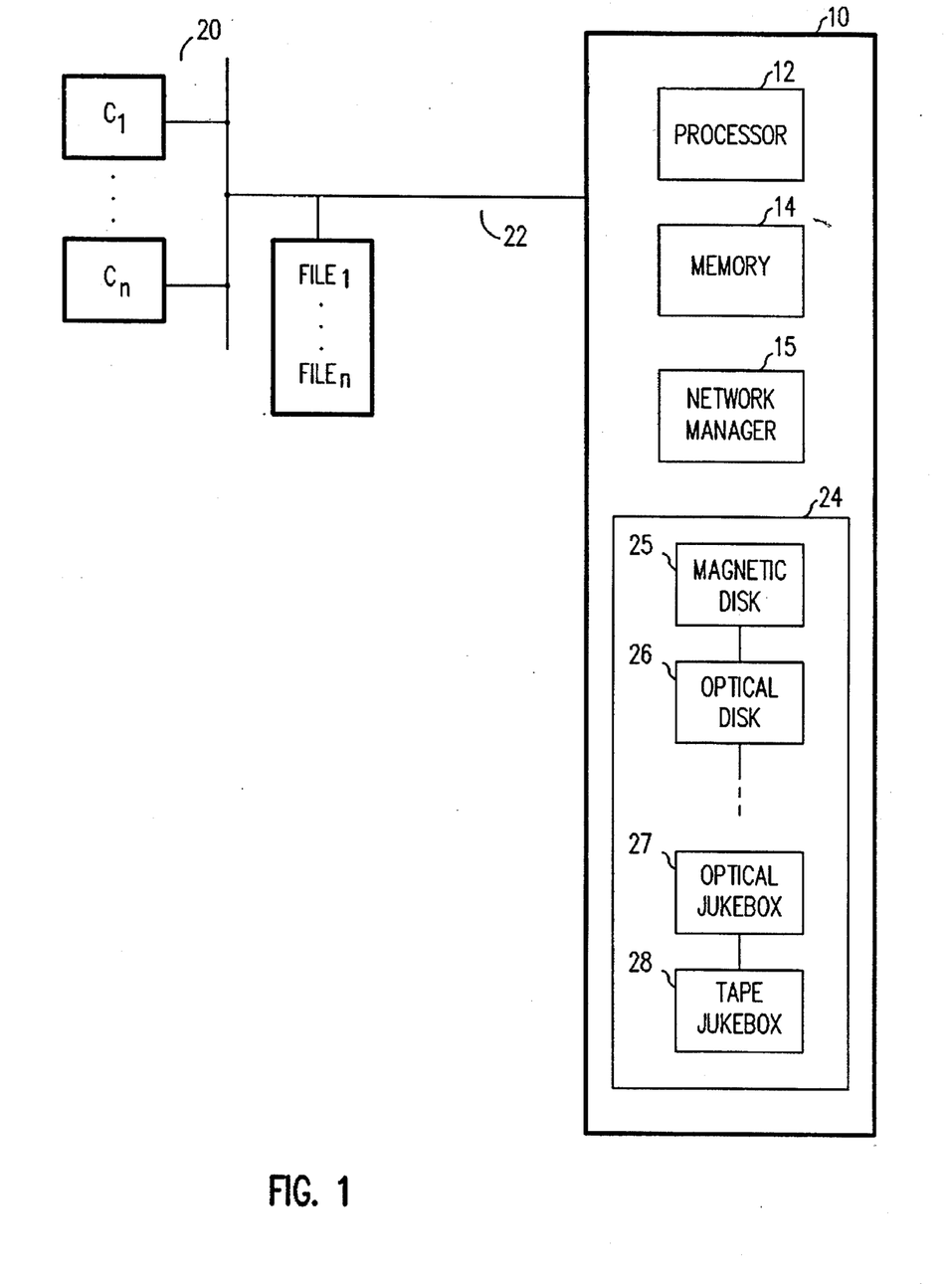
FIG. 1 is a schematic diagram of a distributed data object placement management system.

Referring to FIG. 1, a distributed object placement management system comprises a server 10 having a central processing unit (CPU) 12, a memory 14, and a network manager 15. The server 10 is connected to a plurality of clients 20 through an interconnection media 22 such as Token Ring LAN or Ethernet LAN. The clients each have CPUs and main memory as well as non-volatile storage devices. The server communicates via a bus or other interconnection media with a storage hierarchy 24 comprising storage devices such as magnetic disks 25, optical disks 26, optical jukeboxes 27 and tape jukeboxes 28.

There are many variations of the system shown in FIG. 1, known to those skilled in the art, for providing the storage management system of the present invention.

The invention specification procedures may be implemented using standard programming and/or engineering techniques. The resulting program or programs may be stored on disk, diskettes, memory cards, ROM or any other memory device. For execution, the program may be copied into the RAM of the storage management system server. One skilled in the art of computer science will easily be able to combine the software described with appropriate general purpose or special purpose computer hardware to create a computer system embodying the invention.

The co-location algorithm moves related objects together through the hierarchy by collecting meta data on the objects and logically clustered collections (such as named collections) to which they belong and for media instances where they will be stored. In all operating systems such as DOS, IBM OS/2, all varieties of UNIX, IBM VM, SUN OS, Macintosh, and Novell operating systems, it is possible to gather the meta data needed by the system or to approximate it conveniently. The list of meta data that is needed is as follows:

A. Identity of the client node. (For example: an IP address in the network.)

B. Identity of the physical device where the object resides. (For example: the identification of the most specific disk drive device.)

C. Identity of the owner of the object. (For example: the user ID which needs to be unique only within a specific client node; if a computer is single-user, one does not need this information.)

D. Identity of the logical cluster where the named collections of objects reside. (For example: in UNIX, the name of the file system that contains the directory being backed up; and in DOS, the name of the logical device containing the group of files.)

E. Attributes of the named collection that contain the individual objects being backed up. (For example: the attributes of an individual directory in a file system.)

F. Attributes of the individual object being backed up. (For example: the attributes of an individual file in a file system.)

The two primary pieces of information used in the preferred embodiment of the system and the method for the effective co-location of related objects are the identity of the client node where the files reside and the identity of the logical cluster, such as the file system in UNIX, to which it belongs.

The co-location algorithm stores in a minimum number of media instances of a level in a multi-level storage hierarchy a set of related objects being moved. When the user requests that a named collection of objects be moved incrementally, the system attempts to perform this as efficiently as possible. Thus, it attempts to minimize the total elapsed time determining which objects need to be moved, finding the archival media instance where they will be copied into and actually doing the transfer of the objects into the archival media.

The system efficiently supports the central but rather infrequent operation of restoring sets of related objects. The system also minimizes the number of archival repositories visited when performing a number of retrieval requests for objects based on users' (clients') dates, named collection and logical clusters. The following requests are all optimized:

R1—retrieve an object backed by user U of client C;

R2—retrieve an object backed by user U of client C as of date D;

R3—retrieve all objects backed by user U and a named collection N on client C;

R4—retrieve all objects backed by user U and a named collection N of client C as of date D;

R5—retrieve all objects backed by user U in a logical cluster L of client C;

R6—retrieve all objects backed by user U in a logical cluster L of client C as of date D;

R7—retrieve all objects backed by user U in device S of client C;

R8—retrieve all objects backed by user U in device S of client C as of date D;

R9—retrieve all objects backed by user U of client C;

R10—retrieve all objects backed by user U of client C as of date D;

R11—retrieve all objects in device S of client C;

R12—retrieve all objects in device S of client C as of date D;

R13—retrieve all objects in client C;

R14—retrieve all objects in client C as of date D;

R15—retrieve all objects backed by user U;

R16—retrieve all objects backed by user U as of date D.

When retrieving sets of objects in a storage hierarchy, ideally all the objects involved in each of the above requests should be in one media instance. In systems like DOS and UNIX, the best that can be done for R7 and R8 requests is a sequence of R5 and R6 operations. Those two operating systems hide the underlying device configuration from application software so that only the high level abstraction of a logical cluster can be used such as the file system in UNIX.

Figure 2:
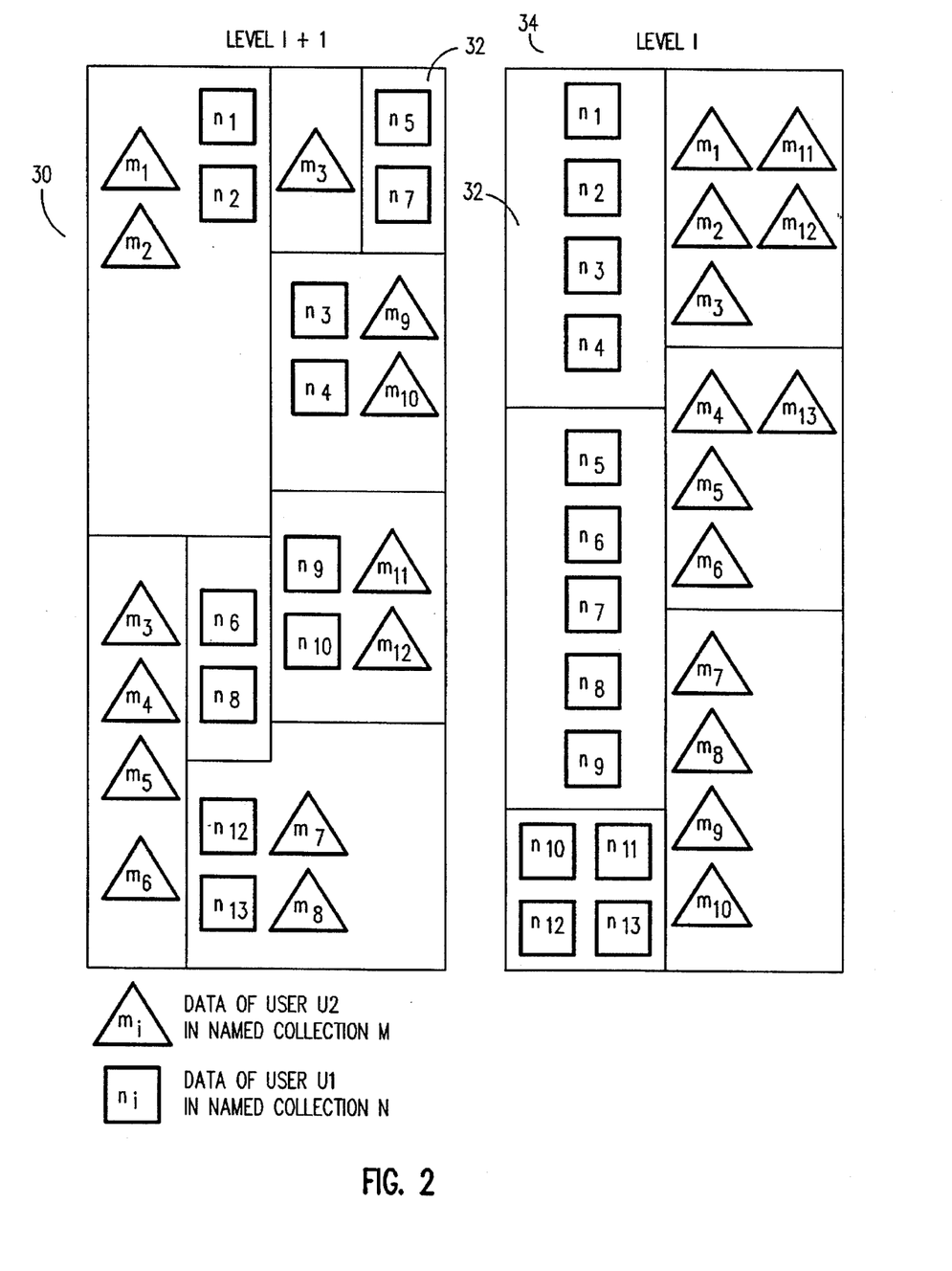
FIG. 2 is a schematic diagram of data objects scattered within a first level of a hierarchy and data objects clustered together within the next level of the hierarchy.

An overview of the results of the co-location process is illustrated in FIG. 2, where the data is moved from one level to the next lower level in the storage system as clusters. The data objects of the user U1 in named collection N and the data of user 42 in named collection M are scattered in level I+1 of a storage hierarchy 30. Each instance 32 represents a storage media instance. In level I of the hierarchy 34, the data is clustered together for named collection N of user U1 and named collection M of user U2.

Figure 3:
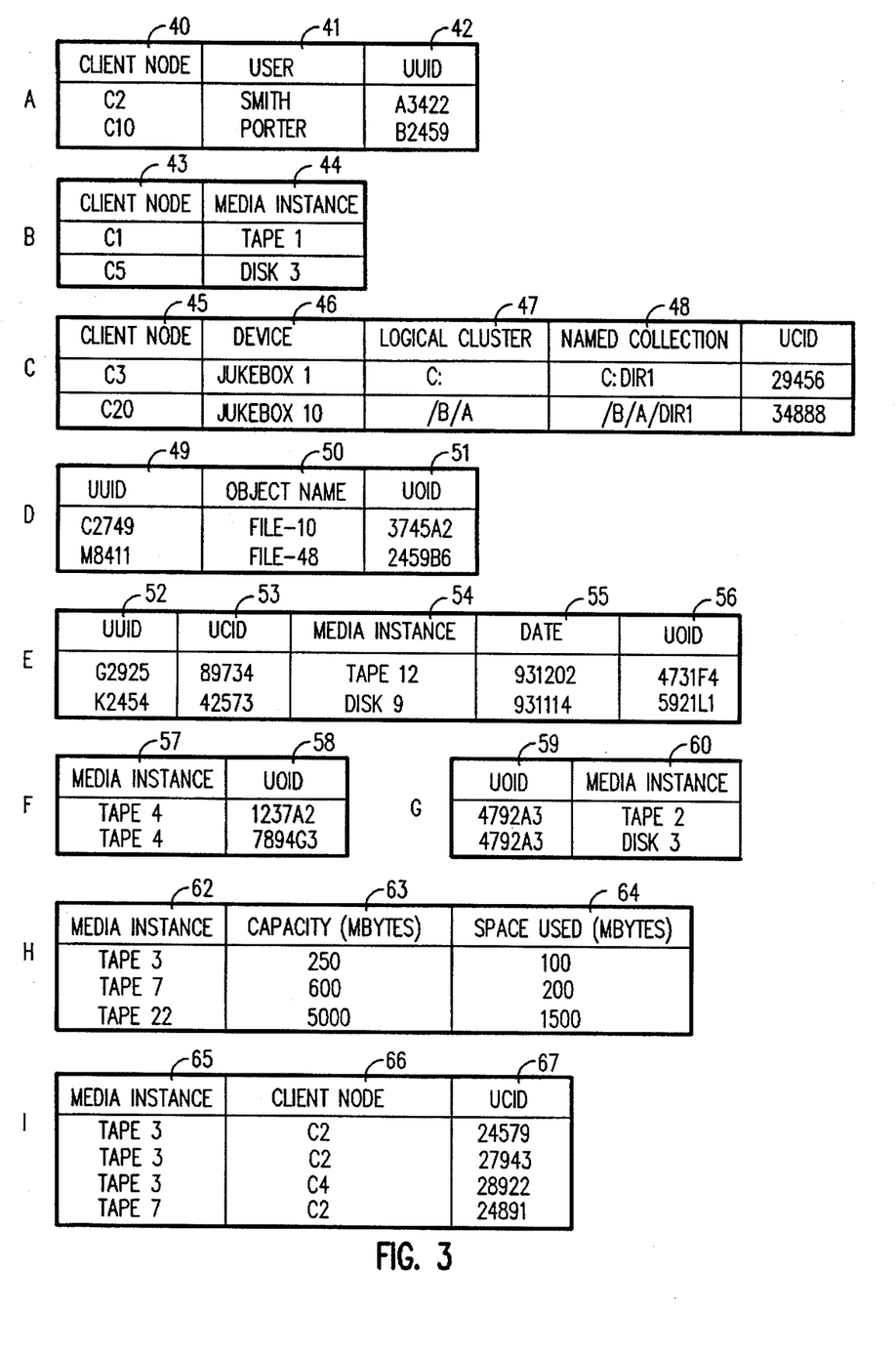
FIG. 3 is a set of meta data mappings of information about the data objects and the storage system.

The co-location algorithm maintains meta data in data structures that are stored in the computer system. The data structures contain the mappings between the objects, the client and the media instances. FIG. 3A shows a mapping between the parent client node 40 and users 41 to a unique user ID 42. This mapping assigns and maintains system wide unique user identifiers (UUID) for all users of the system. FIG. 3B shows a mapping between client node 43 and archival media instance 44. This mapping tracks the set of media instances that contain objects from a given client node.

FIG. 3C shows a mapping between client nodes 45, devices 46, logical clusters 47, named collections 48 and unique collection IDs (UCID). This mapping assigns and maintains system wide unique collection identifiers for all named collections in the system. The system internally treats collections differently than individual objects because the state of collections needs to be tracked in different instances in time. In particular, when a named collection is deleted and later created again, the new version will have a different UCID.

FIG. 3D shows a mapping between UUID 49, individual object names 50 and unique object IDs UOID 51. This mapping assigns and maintains system wide unique object identifiers for all individual objects in the system. FIG. 3E shows a mapping between UUID 52, UCID 53, archival media instances 54, date 55 and UOIDs 56. This mapping tracks the complete state of the UCID at a given date. All of the names and identifying states of all objects are stored that existed in a named collection at a given date. In that way, all of these objects can be moved for the purposes of recreating the state of the system as it existed at a given date.

FIG. 3F shows a mapping from archival media instances 57 to UOIDs 58. This mapping indicates what objects exist in a given archival media instance. FIG. 3G shows a mapping from UOIDs 59 to archival media instances 60 to determine in which archival media instances a given object has been stored.

When a user requests to move a logically clustered collection, and particularly a named collection, of objects down the storage hierarchy, the system acquires the following information from the user's request in the client system: A set or tuple of the client, user ID, device, logical cluster, named collection and request date. The request date does not need to coincide with any of the last dates that the objects in the named collections have been modified.

When a named collection is moved for the first time to any of the media instances, either from the disk staging area of the server or directly from the client to the media instance because the server did not have a disk staging area, a media instance needs to be assigned for it. For this purpose, the system maintains a table as shown in FIG. 3H with the information regarding a media instance 62, capacity of each media instance 63, and the amount of space used in each media instance 64. Another mapping is maintained as shown in FIG. 3I, between media instances 65, node IDs and logical cluster IDs 67. In the absence of precise size information on the logical cluster, the system chooses the media instance for storing the cluster using a historical estimation of the size of a logical cluster over its lifetime; for example 100 megabytes in a workstation based environment using the media instance location algorithm depicted in FIG. 4.

Figure 4:
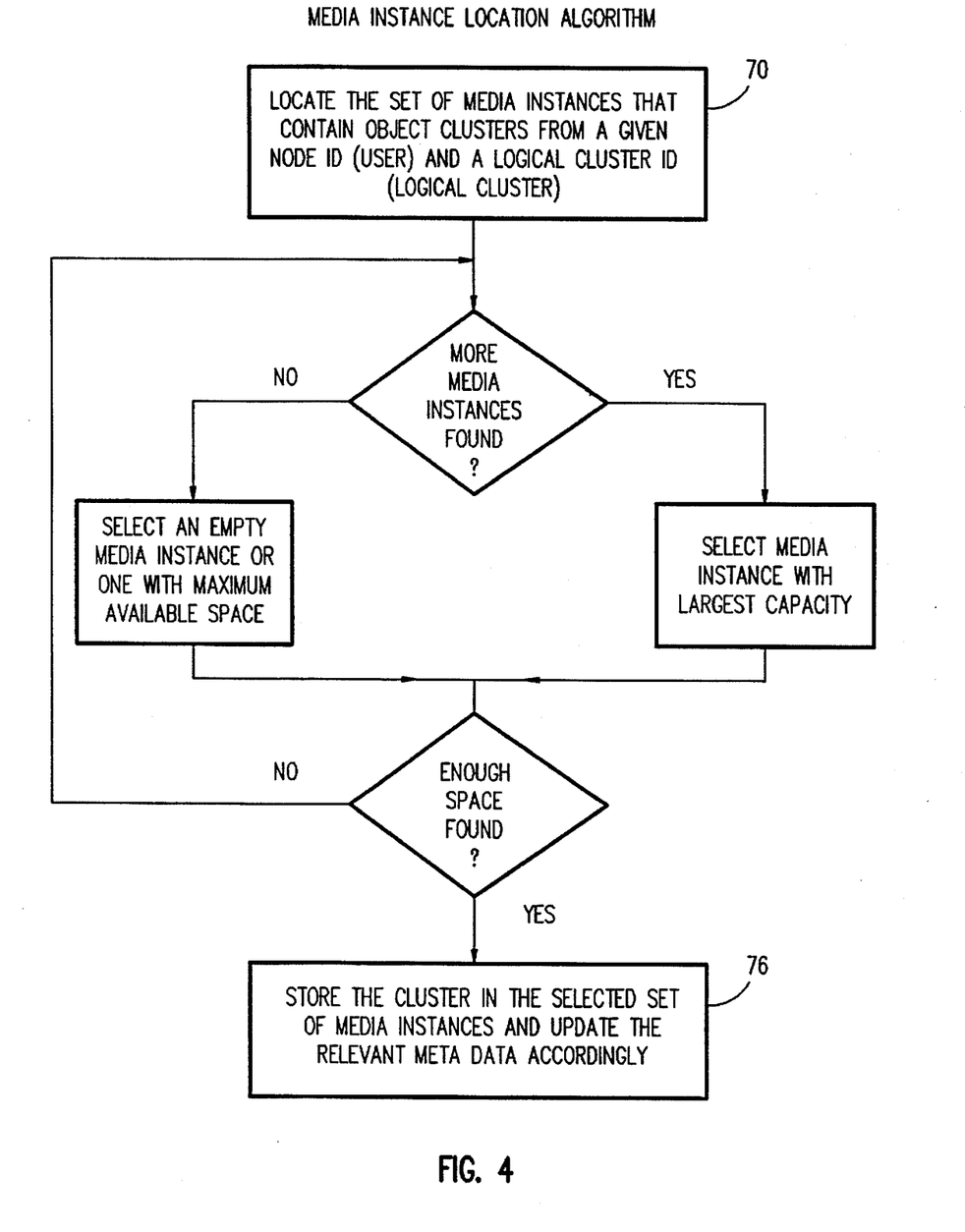
FIG. 4 is a flow chart of the process for locating media instances.

Referring to FIG. 4, the object placement management system locates media instances in a lower level of a storage hierarchy for a logical cluster by first attempting to find the set of media instances that already contain logical clusters from the same node ID 70. When no media instances containing logical clusters from the same node ID are found, an empty media instance is selected when available. When there are no empty media instances, a media instance with the largest available storage capacity is selected 72.

This practice spreads logical clusters originating from different computing orders over different media instances. All available media instances are examined that were selected containing the logical cluster, empty or with maximum available space. The media instance with the largest available capacity is selected. This step allows for the future growth of a logical cluster as incremental moves of it will have space on the average in the same media instance. When the available storage capacity is guessed from the estimated size of the logical cluster, then the process proceeds by trying to select empty media instances where possible or media instances with largest available capacity until sufficient storage is found. When the available storage capacity is less than the size of a logical cluster, an empty media instance is used or a media instance with the largest capacity. When sufficient storage is found, then the meta data is updated to select the choice of media instances 76. That is, the tables are updated to reflect the object's association with the media instance.

Figure 5:
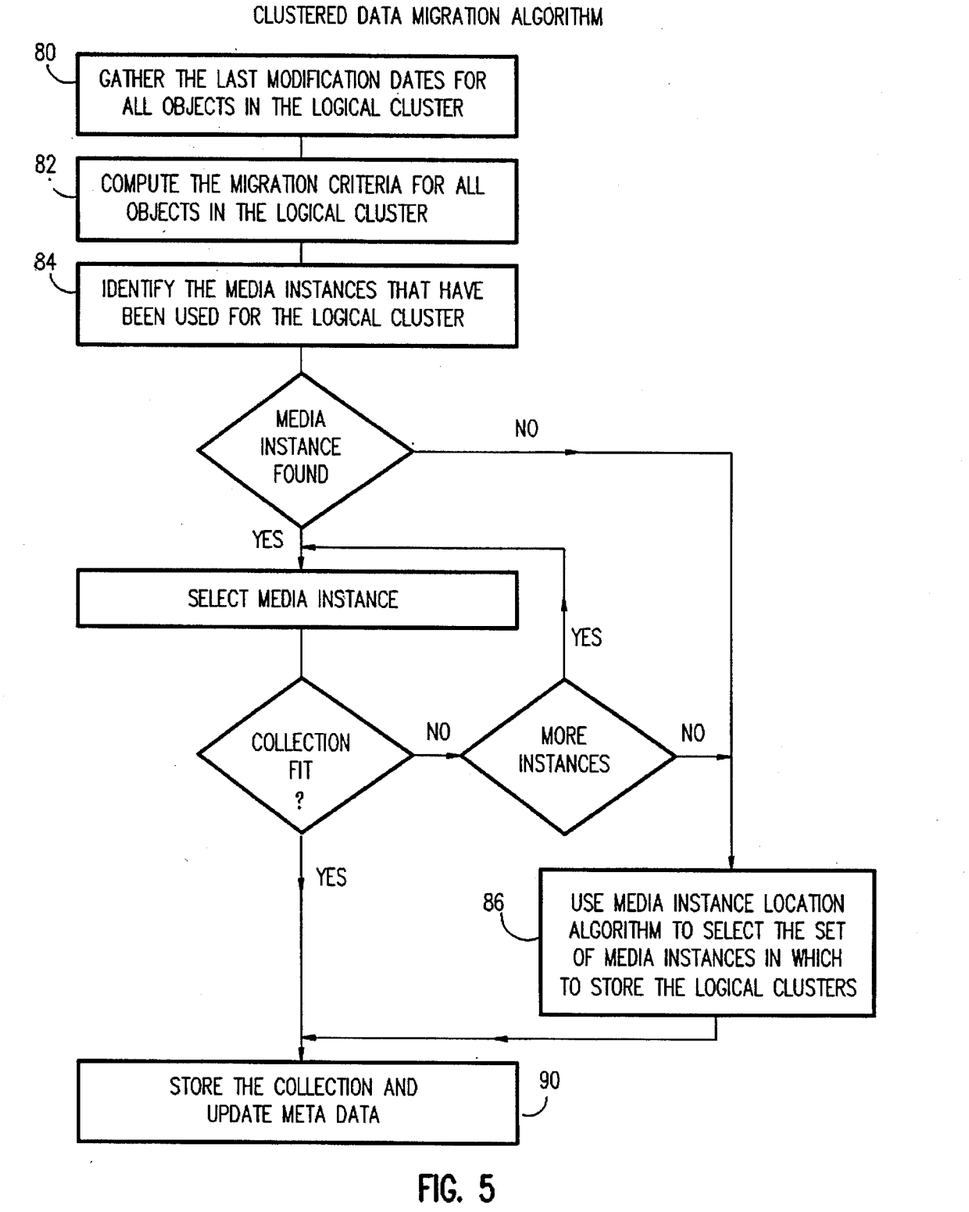
FIG. 5 is a flow chart of the process for migrating a specified collection of logically clustered data objects to the next lower level of the storage hierarchy.

When there are no exceptional conditions (like running out of space in the staging area of the server, or in a media instance), and when using the date of last modification as criteria for incremental movement of objects, the system will move a specified logical cluster that has already been moved previously to the next level of storage using the clustered data migration algorithm depicted in FIG. 5.

Referring to FIG. 5 first, the last modified date of all objects in the logical cluster is gathered and preserved 80. The information is stored in the mapping in FIG. 3C. This mapping provides a list of candidate objects for moving down the storage hierarchy that are part of the named collection. The server establishes a list of which objects from the logical cluster need to be moved based on the meta data provided from the prior move to this level of the hierarchy 82. Next, the candidate media instance for these objects is determined by using the same media instance used before at this level of the storage hierarchy for this logical cluster originating from this node 84. When the set of objects to be moved does not fit in this media instance, a new media instance needs to be identified using the media instance algorithm (FIG. 4) 86. Otherwise, the media instance with the largest available capacity is used. Once the foregoing is completed, the meta data is updated to reflect the choice of media instance 90. Any criterion can be used for the incremental movement of objects. There is no limitation for using the date of last modification as the sole criteria. In the preferred embodiment, a combination of space utilized and time of last modification is used.

The object placement policy minimizes the number of media instances used to store the objects that belong to a logical cluster, such as a specific named collection. Moreover, it also minimizes the number of media instances used to store objects originating from a given client node. When at any time the system needs to spill over the storage of a logical cluster to another media instance, it is selected with as much co-location affinity as possible trying to cluster according to the UUID, client node, device in a client node, or UCID. Later, when storage can be reclaimed from the media instances at a specific level of the storage hierarchy, objects or clusters of objects are co-located according to these criteria to regain maximum co-location and to be able to retrieve the object from a minimum number of storage media instances. When objects are placed in several storage media instances without following this procedure, affine or related objects are usually scattered over several storage media instances. Using the co-location algorithm, affine objects are clustered in a minimal number of storage media instances. For example, affine objects can all be placed in one storage media instance.

When the server has a disk storage area to stage objects, this area also needs to be managed. The requirements for the management of this storage area are that space be available for clients to store additional objects being moved down the storage hierarchy and that objects that have already been moved to a lower level of the storage hierarchy be retained in the staging area until the space is needed so as to make the most frequent retrievals faster.

The staging area is managed by aggregating all of the space used by the objects in a logical cluster and by first migrating to a lower level the logical cluster that occupies the most space. Moreover, once a media instance in a storage device has been made available to the system, it is used until all the objects in the staging device that have co-location affinity with objects in that media instance have been copied into that media instance. An example of a storage device being made available to the system is when a magnetic tape gets mounted. In the case of any removable storage media, like optical disks and magnetic tapes, this policy amortizes better the high cost of making the media be on-line available to the system for storage and retrieval.

After an object has been copied to a media instance down the storage hierarchy, the space it occupies is marked as immediate reclaimed space. However, the object is not erased from the corresponding storage media. When an object needs to be erased from any storage media at a given level of the hierarchy to make storage space available for new objects being moved into this level, the date of last modification is used as an indicator for possible future usage. File system studies have shown that objects whose contents have been modified recently, tend to be retrieved more often than objects whose contents are older, and that objects whose contents have not been modified for longer periods of time, tend to seldom be retrieved. Thus, to support efficient retrieval of individual objects, all that the system needs to do is keep the younger objects in the higher levels of the storage hierarchy.

Figure 6:
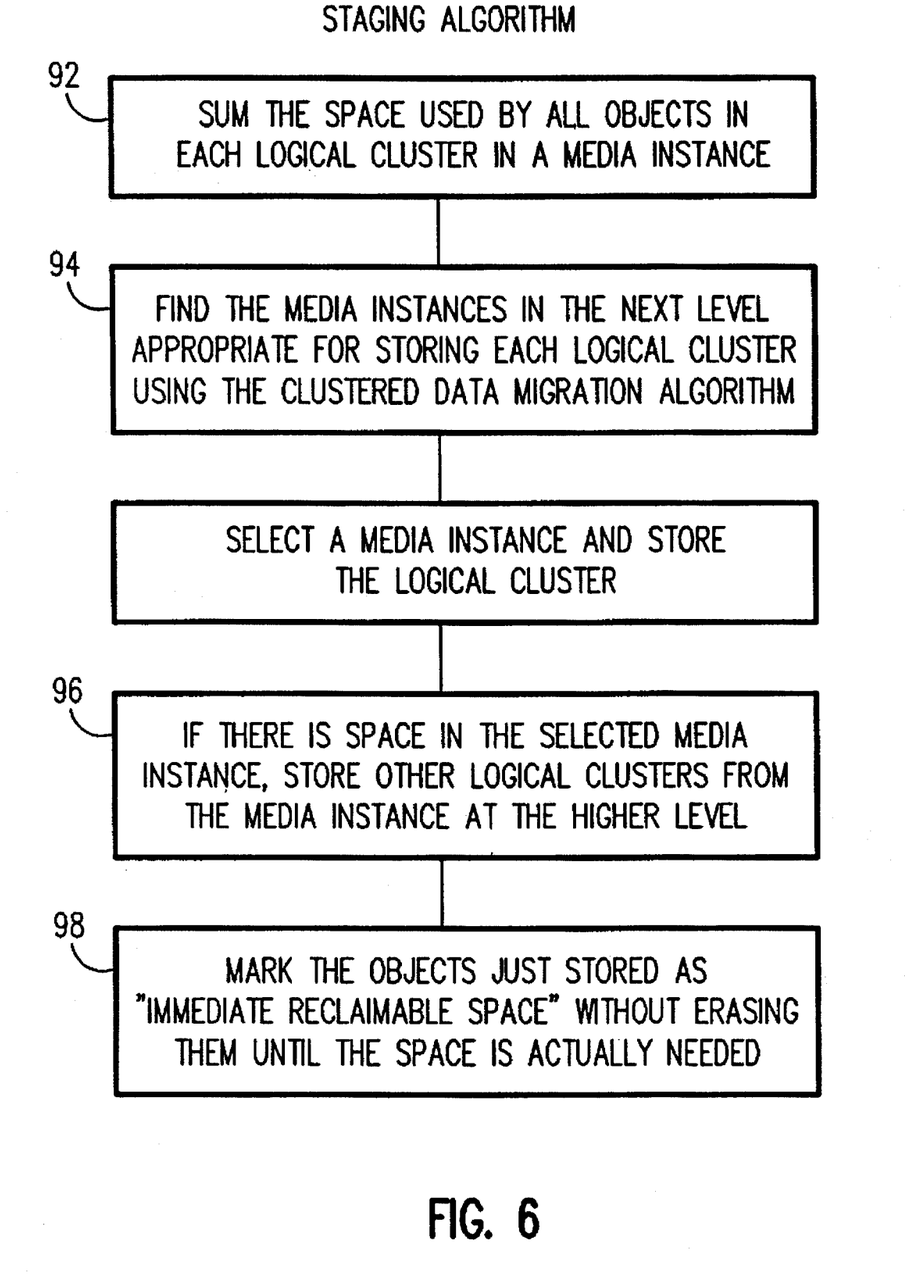
FIG. 6 is a flow chart of the server staging algorithm.

Referring to FIG. 6, in the server staying algorithm, the space in the server staging area used by all objects present in each logical cluster are summed 92. Next, the media instances in the next level are found that are appropriate for the logical cluster occupying the most space using the clustered data migration algorithm (FIG. 5) 94. The media instances are selected and the logical clusters are stored in the selected media instances. When there is space left in the next lower level, other logical clusters that are present in the media instance in the higher level of the hierarchy are stored in the media instances in the lower level 96. The space that is used for storing the objects that have just been copied to the next level is marked as immediate reclaimed space without deleting the objects until space is actually needed 98.

The lowest level of the storage hierarchy is normally the archival repository where the monetary cost of storing objects is least expensive. The archival media instances are normally magnetic tapes which are filled from front to end. Deletions of individual objects may occur in the tape causing internal fragmentation where the tape is only partially utilized. The object placement management system has a minimum occupancy threshold that determines when the contents of an archival media instance needs to be reclaimed and the live objects (objects that have not been deleted) need to be placed in another media instance. This reclaim operation is performed by the server autonomously independent of client request to move objects.

When reclaiming space at any level of the storage hierarchy, the same general co-location algorithm is used as when moving objects within the storage hierarchy. The mappings in FIGS. 3E, 3F and 3G are used to determine the co-location characteristics of the contents of the objects that need to be placed in other media instances. The mappings in FIGS. 3B and 3E are used to determine a target media instance or set of media instances. All of the live objects are placed in the target media instances that need to be preserved from the media instance being reclaimed.

A media instance may have objects from several named collections, perhaps even originating from different client nodes. The selection of a target media instance takes into account the nodes of origin and the UCID. The reclamation procedure attempts to maximize the co-location affinity of the sets of objects. When there are no other media instances containing objects from the same UCID, a media instance is chosen that contains named collections from the same node ID. When there are no other media instances containing objects originating from the same node ID, a media instance is chosen using the media instance location algorithm (FIG. 4). In particular, when empty media instances are available, an empty media instance is used to place all the objects that originate from a given node ID.

Figure 7:
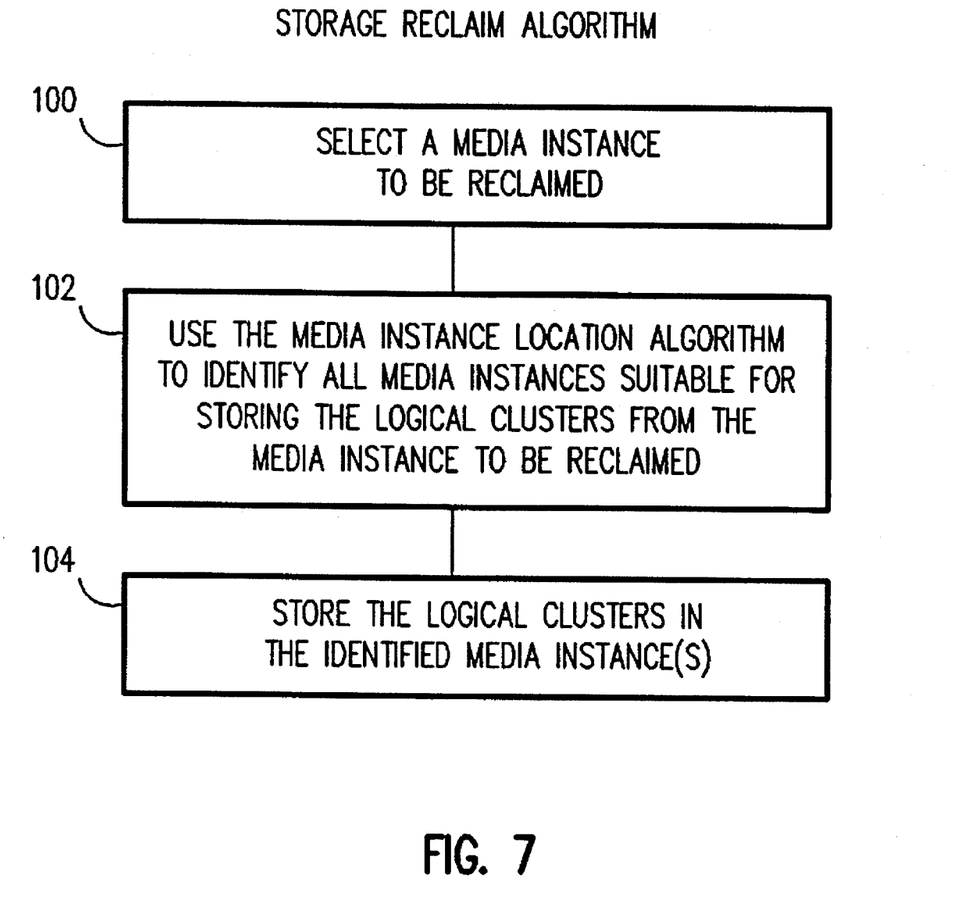
FIG. 7 is a flow chart of the server storage reclamation algorithm.

Referring to FIG. 7, in the server storage reclamation algorithm, a media instance to be reclaimed is selected 100. Next, the set of all other media instances that are appropriate for storing the logical clusters in the selected media instance are identified using the media instance location algorithm (FIG. 4) 102. The logical clusters in the selected media are stored in the identified media instance set 104.

As an option to the client, the object placement management system exports a command that allows the off-line compaction of the set of media instances used to store a given logical cluster. This mechanism provides clients with an explicit control of the degree of co-location of client objects by allowing clients to reduce the number of media instances that contain a logical cluster. This option can be used for each of the levels of the storage hierarchy.

At any point in time, the system can report to a client what space is occupied by the objects that belong to a logical cluster in a given level of the storage hierarchy. The system also reports the number of media instances that store the logical cluster. The client can then request that this number of media instances be reduced. Using the algorithms to reclaim storage at a given level of the hierarchy, but now focused to only one logical cluster, the server first determines if the number of archival media instances can be reduced and then when possible, reduces the number of archival media instances.

The object placement can also be improved within a media instance. Data placement is a key performance factor for efficiently retrieving a set of objects in a media instance. In an optical disk, for example, reducing the number of seeks necessary to retrieve the desired set of objects improves performance. In magnetic tapes, reducing the number of tape positionings improves the performance of bulk retrievals.

The system exports a command that allows the off-line alignment of sets of data in archival storage. This mechanism provides clients with an explicit control on the degree of alignment of their objects in a given archival repository. This alignment is achieved by placing contiguously in the archival media instance, all objects that belong to a given named collection and all named collections that belong to a given logical cluster. If the size of the disk staging area of the server and its main memory are not sufficient to hold all the live data present in the media instance being aligned, the alignment of the objects may require, in the case of magnetic tapes, several passes over the data. Improving placement within the media instances is important to lessen retrieval times.

A new media instance may also be easily added to the system. The co-location algorithm exploits well the addition of media instances at any level of the storage hierarchy. The system will tend to place in any empty media instance, objects with co-location affinity. When a new media instance is made available to the system, it then becomes part of the pool available for storage placement and also for storage reclamation. When the storage reclamation procedure is executed, these new and therefore empty media instances are premiere candidates for placing sets of objects with maximum co-location affinity (i.e., originating from the same client node and belonging to the same logical cluster).

There are a number of advantages of the co-location algorithms of the present invention. There are no restrictions on the individual size of a data object or on the size of a set of data objects being moved within the storage hierarchy. Objects stored at a specific client node are moved to a minimum number of media instances of a storage hierarchy. Objects that reside in one physical device at a client node, even from different owners, reside in a minimum number of media instances of the storage hierarchy. Temporal co-location of objects is preserved as all objects that belong in a named collection of objects at a given date are moved to a minimal number of media instances of the storage hierarchy. The meta data required to support the co-location policy algorithm can be gathered while doing a single pass over the objects. The co-location policy algorithm can be executed efficiently for moving objects down the storage hierarchy thus reducing the time to retrieve named collections and other logical clusters of objects from lower levels in the hierarchy to higher levels without severely impacting the time to perform the migration of objects down the hierarchy.

The space reclamation procedure in a multi-level storage hierarchy of a server preserves and can even enhance the existing temporal and spacial co-location of objects in a storage hierarchy. A client may request that the system assign a specific storage pool to all objects originating from a client node. A client may also request the system to streamline the placement of objects in a given media instance to minimize the time taken to retrieve co-location objects from the media instance. All the management of object storage and object movement is done transparently without any intervention by the clients or the system.

It should be understood that the foregoing description is only illustrative of the invention. Various alternatives and modifications can be devised by those skilled in the art without departing from the invention. Accordingly, the present invention is intended to embrace all such alternate modifications and variances which fall within the scope of the appended claims.

We claim:

1. A computerized data storage management system for managing data stored in a storage hierarchy having memory, central processing unit (CPU), and a plurality of levels of media instances wherein data is stored more economically in a lower level media instance, said system comprising:

means for identifying a collection of related data objects in a given level of the storage hierarchy;

means for identifying at least one media instance in a lower level for storing said collection so that a maximum number of data objects in the collection can be stored together in the same media instance; and storage means for storing said collection clustered together in a minimum number of media instances.

2. The system as in claim 1, further comprising means for moving data objects between levels of the storage hierarchy together as a related collection.

3. The system as in claim 1, further comprising means for retrieving the collection from the media instance as a whole, thereby minimizing retrieval cost.

4. The system as in claim 1, further comprising means for retaining a copy of data objects moved down the hierarchy from a given level until storage space in the level is needed.

5. The system as in claim 1, further comprising means for identifying said collections based on a user ID and a file system.

6. The system of claim 1, further comprising a server in communication with a plurality of clients wherein the management system is controlled from the server and data objects are transmitted from the clients to the server for storage in the storage hierarchy.

7. The system of claim 6, further comprising means for the server to determine when data should be transferred from a client to the storage hierarchy.

8. A computerized distributed hierarchical data storage management system comprising:

a server computer system having a central processing unit and memory;

a plurality of client computer systems each having a central processing unit and a non-volatile storage device, in communication with the server;

a hierarchical data storage system in communication with the server and having a plurality of levels of media instances wherein data is stored more economically on a lower level;

means for identifying a logical cluster of data objects in a first level;

means for identifying at least one media instance in a lower level for storing said logical cluster by first attempting to identify at least one media instance already containing other data objects from said logical cluster, second, attempting to identify at least one empty media instance and third, identifying a media instance with the largest available space; and storage means for storing said logical cluster in a minimum number of identified media instances.

9. The system as in claim 8, further comprising means for moving data through each level together as a logical cluster until all of the data in the logical cluster is stored in the lowest level.

10. The system of claim 8, further comprising means for removing copies of data from the first level when storage space in the first level is needed.

11. The system of claim 8, further comprising means for identifying logical clusters based on an owner of the cluster and a file system.

12. The system of claim 8, further comprising means for the server to poll each of the clients to determine when data objects stored at the client need to be transferred to the storage hierarchy.

13. In a computerized data storage system comprising a central processing unit (CPU) and main memory in communication with a plurality of media instances arranged in a hierarchy, a method for moving data objects between levels of the hierarchy comprising the steps performed by the CPU of:

(A) identifying logically clustered collections of objects within a first level of the hierarchy;

(B) identifying a minimum number of media instances within a next lower level of a storage hierarchy for storing the collection so that a maximum number of objects in the collection can be stored together in the same media instance; and (C) moving the collection to the media instances within the next lower level of the storage hierarchy, storing objects in a logically clustered collection together within a level of a hierarchy.

14. The method of claim 13, further comprising repeating steps (A) through (C) until the objects in the collection are on the most economical level of the storage hierarchy.

15. The method of claim 13 wherein the collections are user defined named collections.

16. The method of claim 13, wherein media instances are identified by first identifying a media instance containing objects belonging to the same collection and identifying media instances that are empty.

17. The method as in claim 13, further comprising the step of:

upon request to retrieve a logical cluster, transmitting to the requester the collection from the media instance as a whole thereby minimizing retrieval cost.

18. An article of manufacture for use in a computerized data storage system in communication with a plurality of media instances of different types arranged in a hierarchy, for moving data objects between levels of the hierarchy, the storage system having means to write the data objects to the media instances, and run time environment means, said article of manufacture comprising a computer-readable storage medium having a computer program code embodied in said medium which causes the computer to:

identify logically clustered collections of objects within a first level of the hierarchy;

identify a minimum number of media instances within a next lower level of a storage hierarchy for storing the collection by first identifying the media instances within the next lower level already containing objects belonging to the collection and media instances that are empty; and move the collection to the media instances within the next lower level of the storage hierarchy, storing objects within a logically clustered collection together within a level of a hierarchy.

19. The article of manufacture of claim 18, wherein the computer program code causes the storage system to continue moving objects in the hierarchy until the objects in the collection are on the most economical level of the storage hierarchy.

20. The article of manufacture of claim 18, wherein the collections are user defined named collections.

* * * * *